March 16, 1965 D. M. WAMPLER 3,173,781
APPARATUS FOR BENDING GLASS SHEETS
Filed March 3, 1961 4 Sheets-Sheet 1
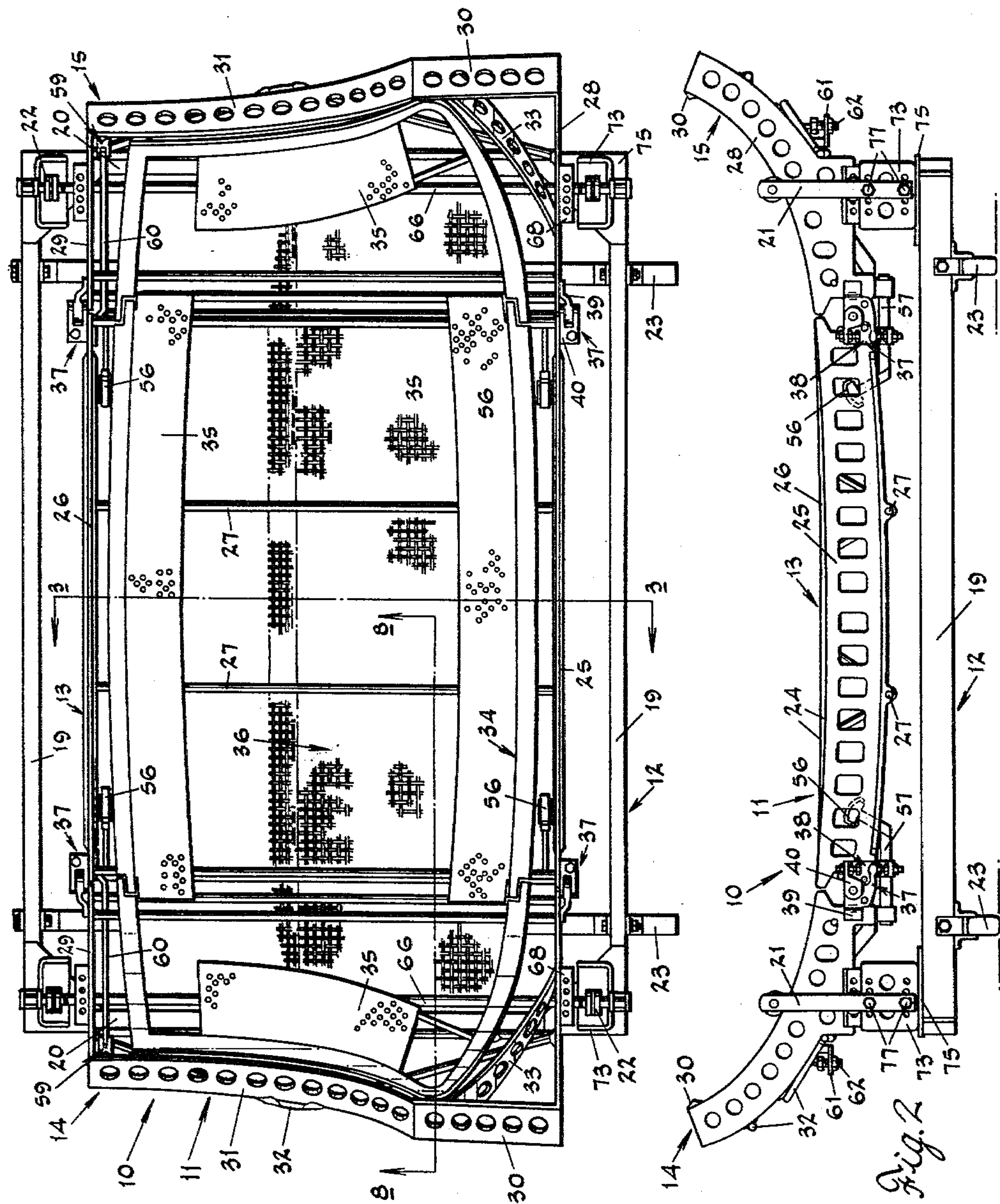
INVENTOR.
David M. Wampler
BY
Nobbe & Swope
ATTORNEYS APPARATUS FOR BENDING GLASS SHEETS
Filed March 3, 1961
4 Sheets-Sheet 2
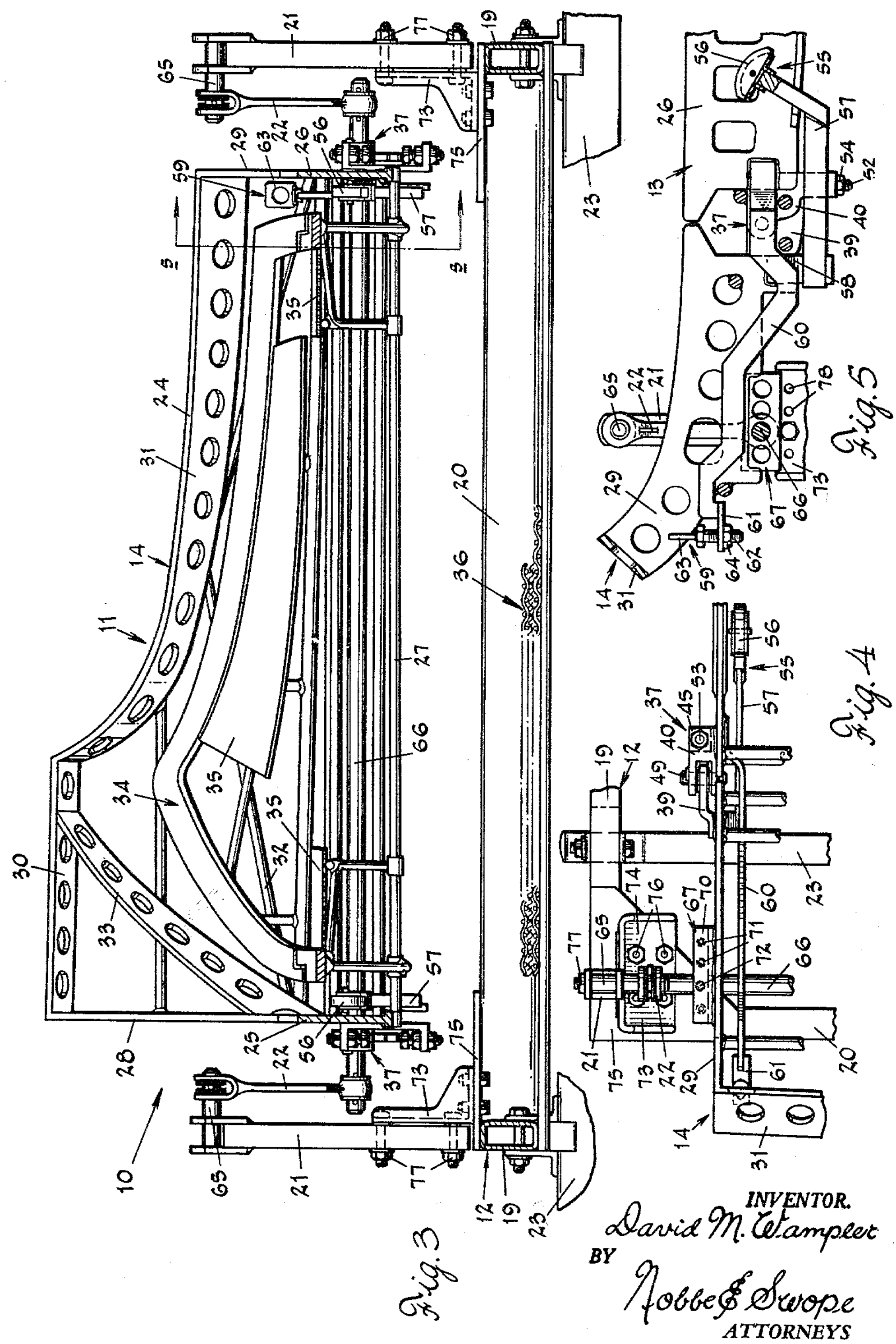
INVENTOR.
David M. Wampler
BY
Nobbe & Swope
ATTORNEYS APPARATUS FOR BENDING GLASS SHEETS
Filed March 3, 1961 
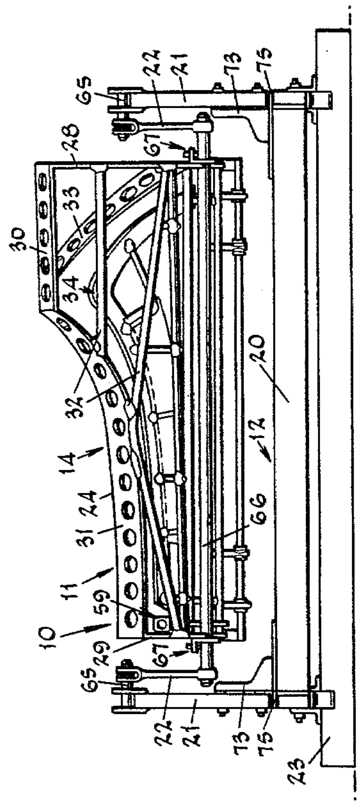
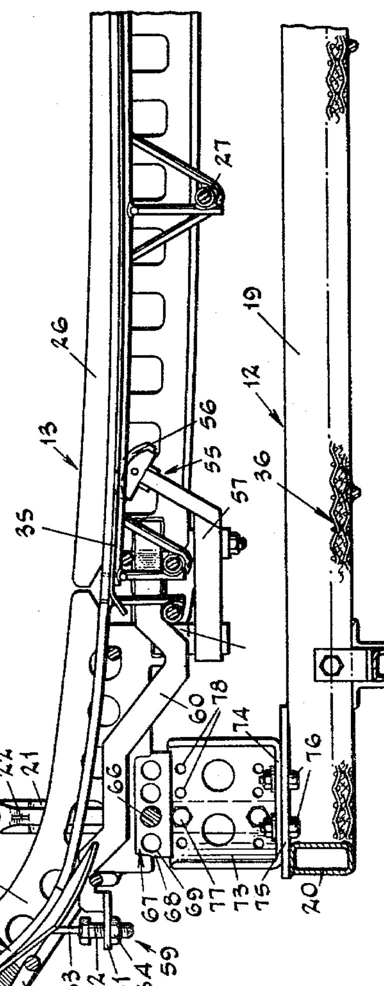
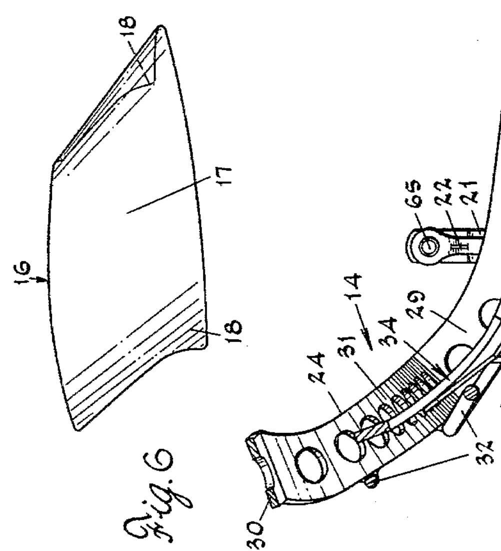
INVENTOR.
David M. Wampler
BY
Nobbe & Swope
ATTORNEYS March 16, 1965 D. M. WAMPLER 3,173,781

APPARATUS FOR BENDING GLASS SHEETS

Filed March 3, 1961 4 Sheets-Sheet 4

INVENTOR.
David M. Wampler
BY
Nobbe & Swope
ATTORNEYS

United States Patent Office 3,173,781 Patented Mar. 16, 1965

3,173,781

APPARATUS FOR BENDING GLASS SHEETS

David M. Wampler, Toledo, Ohio, assignor to Libbey-Owens-Ford Glass Company, Toledo, Ohio, a corporation of Ohio Filed Mar. 3, 1961, Ser. No. 93,247
3 Claims. (Cl. 65—290)

The present invention relates generally to the bending of sheets or plates of glass and more particularly to an improved apparatus for bending the glass sheets or plates.

The recent trend of automobile stylists and designers has been to incorporate increasingly more glass into automobile bodies. Not only is more glass used but also automobile windshields and backlights are being bent into rather intricate configurations whereby they blend into the over-all design of the automobile thus presenting a more pleasing appearance.

The bending of glass sheets into these desired configurations requires the use of somewhat complicated bending molds of the so-called sectionalized type wherein different portions of the mold move relative to each other between open and closed positions; the latter position of the mold portions defining the configuration of the bent sheet. Such molds usually include means for supporting the flat sheet in a horizontal plane as it is passed through a heating means operable to raise the temperature of the glass sheet to its softening point whereupon it sags by gravity into the desired bent shape.

Since these molds are complicated and since the configuration of the bent sheets must be held within rather stringent tolerances, the molds are so constructed as to permit several adjustments to compensate for any changes in the relative position of the component parts of the mold due to wear and/or warpage resulting from the heat to which the mold is subjected. One of these adjustments enables the opened and closed positions of the mold to be varied thereby maintaining the mold portions in their proper relative position and alignment at these positions of the mold. This is important since any change in the relative position of the mold portions in the closed position will alter the configuration of the bent glass sheet, while any change in the open position may prevent the flat glass sheet from being properly supported on the mold in the open position. Another adjustment enables the positions of the various means adapted to support the flat glass sheet prior to bending to be changed. Here again, this latter adjustment may be necessitated by wear or warpage of the parts and, in addition, the need for the adjustment may be dictated by changes made in the open position of the mold by means of the first-mentioned adjustment.

In addition to the foregoing adjustments, it is also important to be able to adjust the closing speed of the mold; that is to be able to adjust the predetermined delay before the mold closes. A slow moving mold will remain in the open position until the glass sheet has sagged practically into contact with shaping surfaces formed on the mold while a fast closing mold commences to close almost immediately upon softening of the glass sheets.

Adjustment of the speed at which the mold closes is necessitated by various factors including the change in weight of the mold sections due to shifting of heat shields incorporated on these sections to control the manner in which the sheet is heated and variations in the thickness of the glass sheets from sheet to sheet. Naturally as the thickness of the sheet is varied, its rigidity varies whereby it offers more or less resistance to the mold as it closes. Another factor affecting the desirability of the adjustment springs from the fact that different furnaces have varied heating characteristics and thus a mold which operates satisfactorily in one furnace may operate less than satisfactory in another. A final factor is the difference in the action of the mold due to wear of the component parts or to changes made in the open position of the mold.

It is, therefore, an important object of the invention to provide a new and improved apparatus of the above character for bending glass sheets which is simpler in construction and yet easier to adjust than former bending apparatus of this type.

Another object is to provide bending apparatus of the above character having a multiple section bending mold, the sections of which are connected together by a novel hinge, which hinge is simple and compact in construction and incorporates a means by which the open and closed positions of the mold may be easily adjusted.

Still another object is to mount the mold on a rack by a simple support enabling the closing speed of the mold to be easily adjusted.

The invention also resides in the novel construction of the support means utilized with the mold and adapted to support the flat sheet of glass as it is being heated.

Other objects and advantages of the invention will become more apparent during the course of the following description when taken in connection with the accompanying drawings.

In the drawings, wherein like numerals are employed to designate like parts throughout the same:

FIG. 1 is a plan view of a bending apparatus incorporating the novel features of the present invention;

FIG. 2 is a side elevational view of the apparatus;

FIG. 3 is a sectional view taken along line 3—3 of FIG. 1;

FIG. 4 is a fragmentary plan view showing one corner of the mold and rack;

FIG. 5 is a fragmentary sectional view taken along line 5—5 of FIG. 3;

FIG. 6 is a perspective view of an automobile window formed on the present apparatus;

FIG. 7 is an end elevational view of the apparatus;

FIG. 8 is a fragmentary sectional view taken along line 8—8 of FIG. 1;

Figure 9:
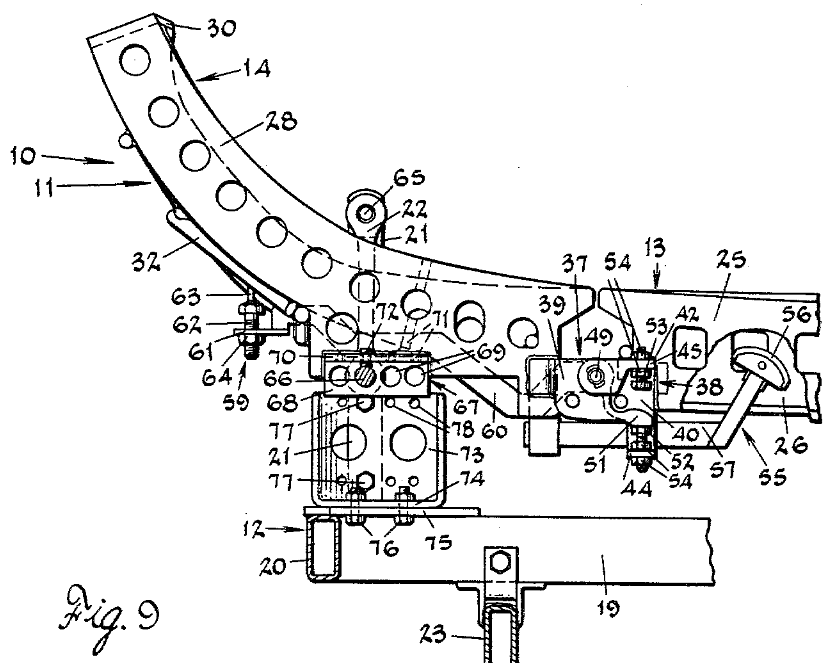
FIG. 9 is an enlarged fragmentary view of one end of the apparatus showing the mold in the closed position.

Shown in the drawings for purpose of illustration is a bending apparatus 10 embodying the novel features of the present invention and comprising generally a sectionalized bending mold 11 supported on a rack 12. The mold 11 includes a central section 13 and two aligned and oppositely disposed end sections 14 and 15 all of which are interconnected in such a manner as to permit relative movement of the sections between the open and closed position of the mold. The mold 11 is adapted to bend glass sheets 16 to the configuration shown in FIG. 6 which has a slightly curved major portion 17 and relatively sharply curved side or wing portions 18 extending substantially at right angles to the major portion at the opposite ends thereof.

A well-known process of bending sheets of glass includes supporting the flat sheets on a mold while the latter is in an open position and thereafter conveying the mold and the sheets through a suitable heating means such as a tunnel-type furnace, thereby to raise the temperature of the sheets to the softening point of glass, enabling them to sag by gravity toward the mold and to lose their rigidity permitting the mold to move to the closed position.

Referring now particularly to FIGS. 1 and 2, the rack 12 supporting the mold includes a pair of parallelly spaced longitudinal side rails 19 joined to one another at their opposite ends by end rails 20 to form a rigid, substantially rectangular frame. A substantially vertical upright 21 is spaced slightly inwardly from each of the opposite ends of the side rails 19 and is fixed to the frame adjacent the opposite ends of each of the side rails so as to be transversely aligned with one another. The mold 11 is suspended from links 22 having one end attached to the upper ends of the uprights 21 and the opposite end attached to the end sections 14 and 15 of the mold. To support the rack 12 upon a conveying means (not shown) commonly used to move the apparatus through the furnace (not shown), transverse guide rails 23 are secured underneath the side rails 19 of the rack adjacent the opposite ends thereof.

The mold 11, as pointed out above, includes a central section 13 and end sections 14 and 15 pivoted together to swing relative to each other about a horizontal axis between an opened and a closed position. The mold 11 is of the so-called ring type having upwardly directed shaping surfaces 24 conforming in plan to the outline of the bent sheets and in elevation to the curvature of the bent sheet. The surfaces 24 are adapted to support the sheets by engagement with the marginal edge portions of the sheets only. The central section 13 of the mold 11 comprises spaced shaping rails 25 and 26 having the shaping surfaces 24 formed on their upper surfaces. In plan view, the rails 25 and 26 are slightly bowed away from each other and are rigidly joined together by the rods 27 spanning the rails with their opposite ends secured thereto. In elevation, the shaping surfaces 24 define a relatively large radius of curvature operable to provide a shallow bend in the major portion 17 of the glass sheets.

The end sections 14 and 15 of the mold are similar to each other in construction and each includes shaping rails conforming in plan to the outline of the ends of the sheets to be bent and have the shaping surfaces 24 formed on their upper side. Each end section 14 and 15 comprises two upwardly curved rails 28 and 29 longitudinally aligned with the shaping rails 25 and 26 on the central section 13 of the mold and joined at their outer ends by two rails 30 and 31 extending across the end of the mold. The rail 28 at one side of the mold is substantially longer than the opposite rail 29 and thus extends a greater distance upwardly above the center section 13 of the mold. One of the rails 30 extending across the end of the mold is straight and extends horizontally inwardly at right angles to the longitudinal rail 28 at one side of the mold and is joined at one end to the outer end of the rail 28. The free end of the rail 30 is connected to the opposite longitudinal rail 29 by the rail 31 which in plan is curved inwardly of the mold. This curved rail is also curved in elevation downwardly toward the free end of the longitudinal rail 29. The various shaping rails comprising the end sections 14 and 15 of the mold 11 are rigidly joined together into a unitary structure by tie rods 32 spanning the rails and fixed thereto as by welding. An additional shaping rail 33 extends diagonally between rails 28 and 30 to conform generally to the outline of the lower edge of the wing portions 18 of the bent sheet 16 (FIG. 6).

In order to place the outer edges of the finished sheet in compression whereby they will be better able to withstand mishandling during shipment and mounting, a strain bar 34 is mounted on the mold 11 to extend around the desired outline of the finished sheet and is spaced below and inwardly of the shaping surfaces 24. The function of the strain bar 34 is to retard cooling of those portions of the sheet directly above it and thus place the portions in tension. Since the shaping surfaces 24 perform substantially the same function, an area of tension will be formed in the sheet above both the bar and the shaping surfaces, resulting in an area of compression therebetween. As a finishing operation, the sheet is cut to the desired size and outline through this area of compression whereby the outermost edges of this sheet will be in compression.

In addition, in order to better control the heating of the sheet and thereby the bending of the sheet, various shields 35 of well-known construction are supported by the shaping rails to retard heating and subsequently cooling of various sections of the sheet according to commonly followed bending procedures.

If the present apparatus is to be used in the manufacture of so-called "cap" windshields, that is windshields which have a relatively sharp bend about a longitudinal axis to provide a rearwardly extending portion at the top of the windshield, a heat absorbing member 36 may be disposed under part of the sheet. This member retards heating of the sheet in the areas directly above it whereby the exposed areas, conforming to the cap portion, sags or overbends an additional amount to provide the sharp longitudinal bend in the sheet.

The end and central portions of the mold are pinned together to move relative to each other between an open position adapted to support the flat sheet of glass (FIG. 10) and a closed position wherein the shaping sections are aligned and conform in curvature to the bent sheet (FIG. 9).

In accordance with the present invention, the end sections 14 and 15 of the mold are connected to the center section 13 by an improved hinge 37 of simple, compact, and novel construction which incorporates an adjustment means 38 whereby the relative positions of the end sections 14 and 15 and central section 13 in the open and closed positions may be varied in an easy manner. Four such hinges 37 are utilized in the present instance; one being mounted at each corner of the central section 13 between the shaping rails 25 and 26 and the rails 28 and 29. Since all four hinges are similar in construction, it will suffice to describe one in detail.

Figure 11:
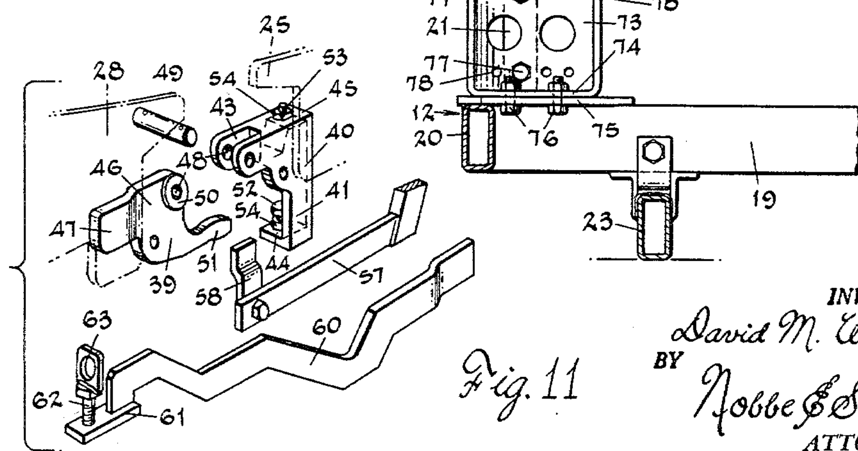
FIG. 11 is a fragmentary exploded view showing the hinge and the sheet supporting means, parts of the mold being shown in phantom.

With reference to FIG. 11, each hinge 37 includes two members 39 and 40, one member 39 being fixed as by welding to the rail 28 on the end section 14 of the mold and the other member 40 fixed to the adjoining end of the rail 25 on the central section 13 of the mold.

The hinge member 40 adapted to be secured to the central section 13 of the mold 11 comprises an elongated bar portion 41 disposed substantially vertically and welded as at 42 along one longitudinal edge to the end of the shaping rail 25 on the central section 13. A bifurcated portion 43 integral with the bar portion 41 extends longitudinally outwardly from the end of the central section. Adjacent the top and bottom ends of the bar portion 41 are flanges 44 and 45 integrally formed therewith and projecting laterally outwardly away from the mold 11 (FIG. 10).

The hinge member 39 adapted to be secured to the end section 14 of the mold comprises a flat block 46 having a flange 47 formed on one end and adapted to be welded to the end of the shaping rail 28 on the end section 14. The block 46 extends longitudinally outwardly from the shaping rail and is received by the bifurcated portion 43 of the member 40. The members 39 and 40 are suitably drilled as at 48 to receive a pin 49 about the axis of which the mold sections pivot relative to each other. To reduce friction between the bifurcated portion 43 and the block 46, laterally extending bosses 50 are formed on the block to engage the inner surface of the bifurcated portions.

Projecting outwardly from the lower side of the block 46 is an elongated finger 51 which is received between the upper and lower flanges 44 and 45 on the hinge member 40. Bolts 52 and 53 project through the upper and lower flanges 44 and 45 and are secured in a fixed position by nuts 54 threaded on the bolts 52 and 53 to bear against the upper and lower surfaces of each flange. The opened and closed positions of the mold are determined by abutment of the finger 51 with the opposed ends of the bolts 52 and 53. Adjustment may be accomplished by simply loosening the nuts 54 and changing the positions of the bolts 52 and 53 relative to the flanges 44 and 45.

Figure 10:
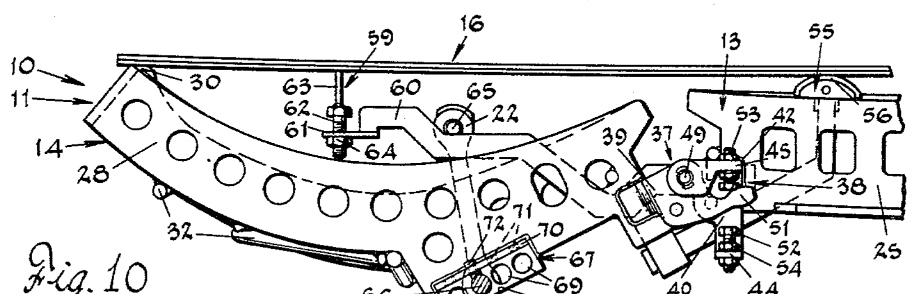
FIG. 10 is a view similar to FIG. 9 but showing the mold in the open position.

When the mold 11 is in the open position, the glass sheets to be bent are supported in a substantially horizontal plane defined by the upper extremities of the shaping surfaces 24 formed on the shaping rail 30 on each end section 14 and 15 (FIG. 10). In order to further support the sheets intermediate the rails 30, additional support means 55 is provided which means engages the sheet approximately one-third of the distance from the opposite ends. Herein, these support means 55 each comprises a Marinite block 56 disposed adjacent the shaping rails 25 and 26 and mounted on one end of substantially L-shaped levers 57, the opposite ends of which are fixed to the end sections through the medium of brackets 58 (FIG. 10). As the mold sections 11 move between the open and closed position, the lever 57 is moved between a raised position wherein the top surface of the block 56 lies in the horizontal plane defined by the shaping surfaces 24 on the rails 30 and a lowered position wherein the block is disposed below the shaping surfaces 24 of the rails 25 and 26 of the central section 13.

As decsribed above, the inwardly bowed rails 31 of the end sections 14 and 15 are curved downwardly from the rail 30 to the rail 29. The bowed rails 31, therefore, lie below the horizontal plane defined by the shaping surfaces on the rails 30 in which plane the flat sheets are supported on the open mold prior to being bent. In order to support the corners of the sheet overlying the bowed rails 31, means 59 is provided to engage these corners when the mold is in the open position and to move out of engagement with the corners as the mold closes. Two such means 59 are provided, one adjacent each of the bowed rails. Herein, each of these means 59 includes a lever 60 fixed at one end to the rail 26 on the central section 13 of the mold 11 and extending longitudinally outwardly therefrom. The free end of the lever 60 is at all times disposed below the plane of the flat sheets when the mold 11 is opened (FIG. 10). A flat, substantially horizontally disposed plate 61 is fixed to the free end of the lever 60 to support a vertically disposed bolt 62 threaded into the plate. An extension 63 welded to the upper end of the bolt 62 projects upwardly with its upper edge lying in the plane defined by the shaping surfaces 24 on the rail 30 to support the flat sheet when the mold is in the open position. In order that the upper edge of this extension 63 will at all times lie in this plane regardless of the adjustment of the open and closed position, the position of the extension may be simply adjusted by threading the bolt 62 into or out of the plate 61. The bolt 62 is secured in any desired position by a nut 64 threaded on the end of the bolt and bearing against the underside of the plate 61.

As pointed out above, it is oftentimes important that the closing speed of the mold be increased or decreased to compensate for changes in the various factors mentioned previously such as variations in the weight of the different mold sections due to shifting of the heat shields, variation in thickness and rigidity of the sheets being bent and variations in heating characteristics of heating furnaces utilized. In general, the closing speed of a mold is determined by the manner in which the various mold sections are supported on the rack; more particularly by the balance of the forces acting on the sections and urging them to swing relative to each other about the axes of the hinge pins.

Usually, molds of this type are supported on the uprights 21 by links 22 journaled on transversely disposed stub shafts 65 projecting through the upper ends of the uprights. The lower ends of the links 22 are pivotally attached to the end sections of the mold to permit relative movement between the mold and the links.

It will be apparent that the so-called balance of the mold depends upon the magnitude of the forces exerted on the mold on the opposite sides of the point at which the lower end of the link is attached to the mold which is the center of rotation about which the end sections turn. The closer these forces are to being in balance, the slower the mold closes. The forces themselves are due to the weight of the mold sections and the weight of the sheets supported by the mold. From FIG. 2 it is apparent that the greater portion of the mold is carried between the centers of rotation and, therefore, there is a tendency for the mold to assume the closed position. This tendency is offset by the weight and rigidity of the sheet which is carried on the shaping rail 30 and the support block 56 located close to the links and which acts as a strut to prop the mold open. As the sheet is heated to the softening point of glass, however, it sags downwardly and loses its rigidity permitting the mold section to move to the closed position.

Thus it is seen that the closing speed of the mold 11 is determined by the location of the center of rotation of the end sections of the mold. The present invention contemplates attaching the lower end of each link 22 to the mold in a novel manner enabling the center of rotation of the end sections to be shifted back and forth relative to the mold to change the balance of forces acting against the mold on either side of this center. To this end, the mold 11 is supported by transversely disposed rods 66 underlying the end sections 14 and 15 of the mold with their opposite ends pivotally received in the lower ends of the links 22 at opposite sides of the mold. The rod 66 is attached to the shaping rails 28 and 29 of the end sections 14 and 15 by a bracket 67 fixed to the rails with their lower ends 68 depending therefrom and being bored as at 69 to receive the rods. By providing a series of holes 69 in the brackets 67 spaced longitudinally along the bracket, the rod 66 may be positioned at different points along the shaping rails.

For this purpose, each bracket 67 comprises an L-shaped member, the leg 68 of which is fixed to the side rails 28 and 29 of the end section with the other leg 70 projecting laterally outwardly. The leg 68 extends below the adjacent shaping rail whereby the rod 66 underlies the underside of the rail and project through aligned holes 69 in the brackets 67 at opposite sides of the mold. To prevent endwise sliding of the rod 66 relative to the brackets, set screws 72 are threaded into the tapped holes 71 in leg 70 of the bracket adjacent each of the holes 69 to bear against the top of the rod 66.

In the opening action of the mold, the central section is elevated by the pivoting of the end sections and in this related movement, the over-all length of the mold is increased; this being accommodated by the swinging action of the links 22 upon the rods 66. It will be apparent that the forces acting against the mold sections and tending to swing the mold toward the closed position depend not only on the weight of the mold sections and the location of the center of rotation but also depend on the angular disposition of the links 22 relative to the uprights 21. Thus, in accordance with another aspect of the present invention, greater adjustability of the closing speed of the mold is permitted by the provision of a means for adjusting the angular disposition of the links relative to the uprights for any position of the mold. This is accomplished by mounting the uprights 21 on the rack 12 so as to be adjustable back and forth along the rack.

To this end, the lower end of the uprights 21 are fixed to the side rails 19 of the rack 12 through the medium of brackets 73 upstanding from the side rails and having a laterally projecting flange 74 engaging a plate 75 secured to the side rails 19. Bolts 76 projecting through the plate 75 into the flange 74 fix the bracket to the plate. The uprights 21 are disposed adjacent the bracket 73 and are attached thereto by threaded fasteners indicated at 77. A series of holes 78 extending in a horizontal line across the brackets 73 permits the uprights 21 to be fastened at various positions longitudinally of the bracket wherein the link 22 may be disposed at the desired angle relative to the rack.

It will be appreciated that a mold constructed in accordance with the present invention enables compensation for the various factors affecting the bending of glass sheets. This is accomplished through the medium of various adjustment means, all of which are simple and compact in construction while, at the same time, being easy and uncomplicated to use. The various adjustments act together to maintain the mold in the proper operating condition regardless of changes in the mold due to wear or warpage, changes in the weight of the mold due to shifting of the heat shields and changes in the properties of the glass sheets. Thus, when one adjustment is made, for instance in the open position, means is provided to adjust the other parts of the mold accordingly, for example in the positions of the sheet supports and the closing speed of the mold. These various adjustments enable the mold to be inexpensively manufactured initially while, in addition, enabling it to be used for long periods of time and repeatedly subjected to high temperatures without adverse effect on its utility.

It is to be understood that the form of the invention herewith shown and described is to be taken as a preferred embodiment of the same, and that various changes in the shape, size and arrangement of parts may be resorted to without departing from the spirit of the invention.

I claim:

1. In apparatus for bending glass sheets, a bending mold comprising a plurality of mold sections disposed end to end and having shaping surfaces formed thereon, hinges pivotally joining said mold sections together, a rack, adjustable means supporting said mold sections on said rack for movement between an open position in which unbent sheets are received thereon and a closed position wherein said shaping surfaces conform in curvature to the sheets when bent, each of said hinges comprising first and second hinge members adapted to be mounted on adjacent ends of said mold sections, a bifurcated portion integral with said first hinge member, said second hinge member being received in said bifurcated portion and connected thereto by a hing pin projecting through holes bored in said portion and said second hinge member, spaced apart flanges formed on said first hinge member to project laterally outwardly therefrom, an elongated finger integral at one end with said second hinge member and extending outwardly therefrom with the free end of the finger disposed between said flanges on said first hinge member, adjustable stop means mounted on said flanges to abut said free end of said finger when said mold sections are in said opened and closed positions thereby to limit relative movement of the mold sections between preselected limits, and sheet support means disposed above said shaping surfaces when said mold sections are in said open position thereby to support the unbent sheet on said mold, and disposed below said shaping surfaces in an out-of-the-way position when said mold sections are in said closed position.

2. In apparatus for bending glass sheets, a bending mold comprising a plurality of mold sections disposed end to end and having shaping surfaces formed thereon, hinges pivotally joining said mold sections together, a rack, means supporting said mold sections on said rack for movement between open and closed positions, each of said hinges comprising first and second hinge members fixed to adjoining ends of said mold sections and pinned together to turn relative to one another about said pin as an axis, laterally extending flanges formed on said first hinge member, stop means mounted on said flanges and having opposed abutment surfaces formed thereon, means for adjusting said abutment surfaces toward and away from each other, an elongated finger integral at one end with said second hinge member and extending outwardly therefrom with the free end of the finger disposed between said abutment surfaces on said stop means to engage said surfaces and thereby to restrict relative movement of said mold sections between preselected limits defining said open and closed positions.

3. In apparatus for bending glass sheets, a rack, a bending mold disposed above said rack and comprising a plurality of mold sections disposed end to end along a longitudinal axis, hinges pivotally connecting adjacent ends of said mold sections together, uprights upstanding from said rack on opposite sides of said mold adjacent certain of said mold sections, links pivoted to said uprights adjacent the upper ends thereof, bars underlying certain of said mold sections intermediate the ends of said sections and journaled at their opposite ends in the free ends of said links, said bar supporting said certain mold sections and thereby the remaining sections on said link to permit movement of said mold sections about said bar as a center of rotation between open and closed positions, brackets fixed to opposite sides of certain of said mold sections adjacent said uprights, each of said brackets having a plurality of longitudinally spaced apertures adapted to selectively receive said rod and secure the latter in a fixed position relative to said bracket, and means mounted on said rack adjacent each of said uprights and adapted to secure the lower end of said uprights to said rack selectively at one of a plurality of longitudinally spaced points.

References Cited in the file of this patent

UNITED STATES PATENTS

| | | |
|---|---|---|
| 2,021,197 | Owen | Nov. 19, 1935 |
| 2,691,854 | Rugg | Oct. 19, 1954 |
| 2,774,189 | Jendrisak | Dec. 18, 1956 |
| 2,814,164 | Carson et al. | Nov. 26, 1957 |
| 2,827,738 | McKelvey | Mar. 25, 1958 |
| 2,861,395 | Richardson | Nov. 25, 1958 |
| 2,901,866 | McKelvey et al. | Sept. 1, 1959 |

FOREIGN PATENTS

| | | |
|---|---|---|
| 746,401 | Great Britain | Mar. 14, 1956 |
| 1,218,678 | France | Dec. 21, 1959 |
| 1,218,679 | France | Dec. 21, 1959 |